United States Patent [19]
Belfer

[11] Patent Number: 5,873,645
[45] Date of Patent: Feb. 23, 1999

[54] FIBER OPTIC CELLULAR REFLECTOR

[76] Inventor: Bruce D. Belfer, 6 Barbara La., Ocean, N.J. 07712

[21] Appl. No.: 926,016

[22] Filed: Sep. 9, 1997

Related U.S. Application Data

[63] Continuation of Ser. No. 284,178, Aug. 2, 1994.

[51] Int. Cl.$^6$ ............................................. F21V 8/00
[52] U.S. Cl. ........................ 362/32; 362/297; 362/346
[58] Field of Search .............................. 362/32, 290, 297, 362/346; 385/116, 119, 120; 353/37; 348/739, 804; 345/32, 905

[56] References Cited

U.S. PATENT DOCUMENTS

| | | | |
|---|---|---|---|
| H542 | 11/1988 | Werkheiser, Jr. | 385/116 |
| 2,985,784 | 5/1961 | MacNeille | 348/804 |
| 3,518,666 | 6/1970 | Heggestad | 385/116 |
| 3,543,384 | 12/1970 | Hansen | 385/120 |
| 5,150,445 | 9/1992 | Toyoda et al. | 385/116 |

FOREIGN PATENT DOCUMENTS

| 524521 | 4/1955 | Italy | 362/290 |
|---|---|---|---|

Primary Examiner—Y My Quach
Attorney, Agent, or Firm—Ezra Sutton

[57] ABSTRACT

A fiber optic cellular reflector is provided, including a honeycomb cell structure having a plurality of connected cells with reflective walls for reflecting light. One or more fiber optic strands is mounted within each of the cells, and there is a source of light for supplying light to the fiber optic strands in the cells. In addition, a control device adjusts the depth of insertion of the fiber optic strands in the cells for controlling the pattern of light reflected from the reflective walls of the cells.

37 Claims, 11 Drawing Sheets

FIBER OPTIC CELLULAR REFLECTOR

This application is a continuation of application Ser. No. 284,178, filed Aug. 2, 1994.

FIELD OF THE INVENTION

The present invention relates to a fiber optic lighting device having a honeycomb cell structure for receiving fiber optic strands within the cell structure for transmitting light for such devices as traffic signal lights, television screens, or VDT displays.

BACKGROUND OF THE INVENTION

Although fiber optic lighting is generally known for providing light in various applications, it would be desirable to provide a device for enhancing and controlling the lighting output of fiber optic devices.

Accordingly, it is an object of the present invention to provide a fiber optic device in combination with a honeycomb cell structure to optimize the light output and to provide new applications.

SUMMARY OF THE INVENTION

A fiber optic lighting device is provided having a honeycomb cell structure including a plurality of connected cells with the cells having reflective walls for reflecting light. One or more fiber optic strands is mounted within each of the cells, and there is a source of light for supplying light to the fiber optic strands in the cells. In addition, control means are provided for adjusting the depth of the fiber optic strands in the cells for controlling the pattern of light reflected from the reflective walls of the cells.

BRIEF DESCRIPTION OF THE DRAWINGS

Further objects, features, and advantages of the present invention will become apparent upon consideration of the detailed description of the presently-preferred embodiments, when taken in conjunction with the accompanying drawings wherein.

DESCRIPTION OF PREFERRED EMBODIMENT

Figure 1:
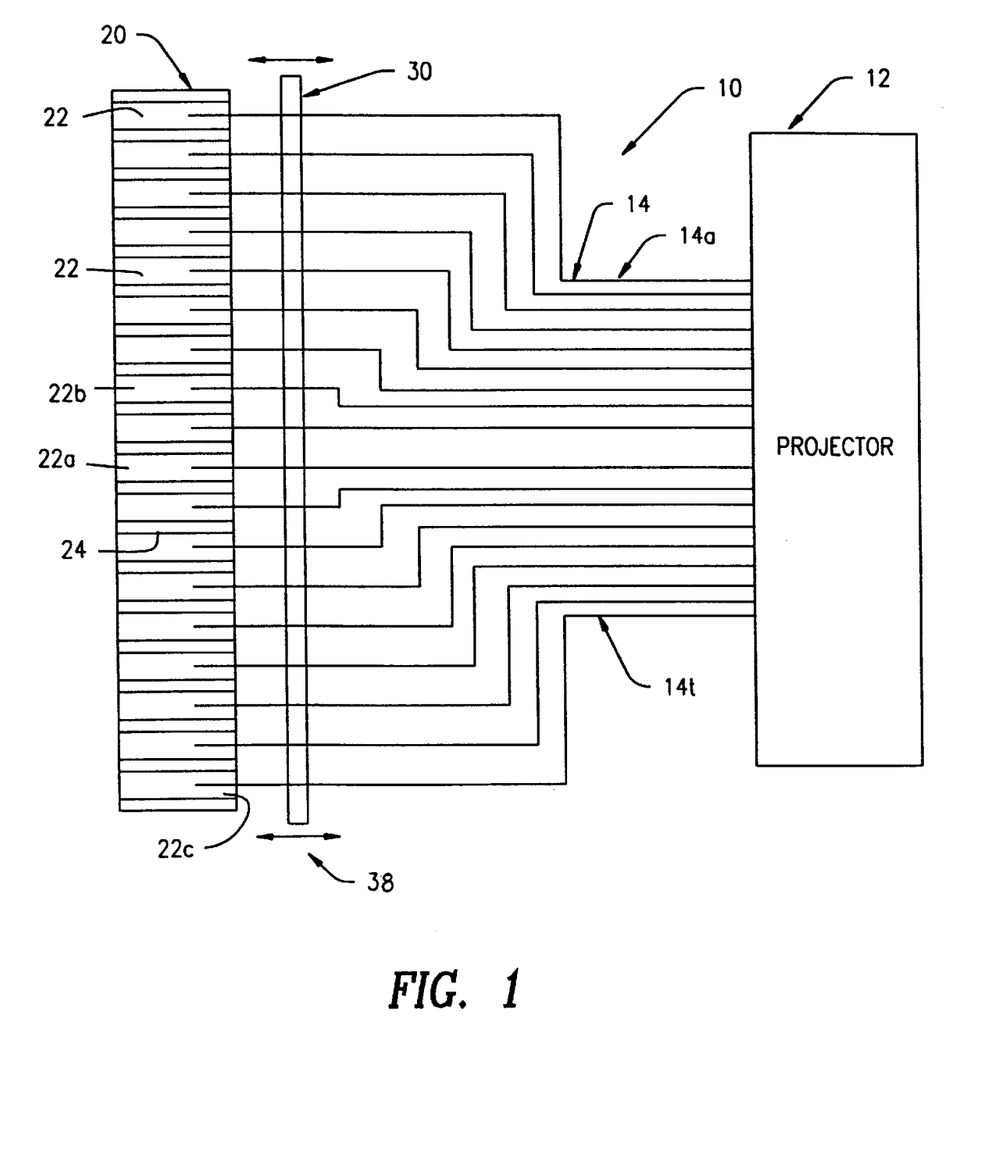
FIG. 1 is a diagrammatic view of the present invention.

FIG. 1 shows a fiber optic lighting device 10 in accordance with the present invention. There is shown a projector or light source 12 having one or more light bulbs for providing light to a plurality of fiber optic strands 14, designated as 14a to 14t. It should be understood that the number of fiber optic strands 14 may be varied, depending on the application. In addition, projector 12 may include a number of colored lenses for controlling the color of the light transmitted on fiber optic strands 14a to 14t.

Figure 2:
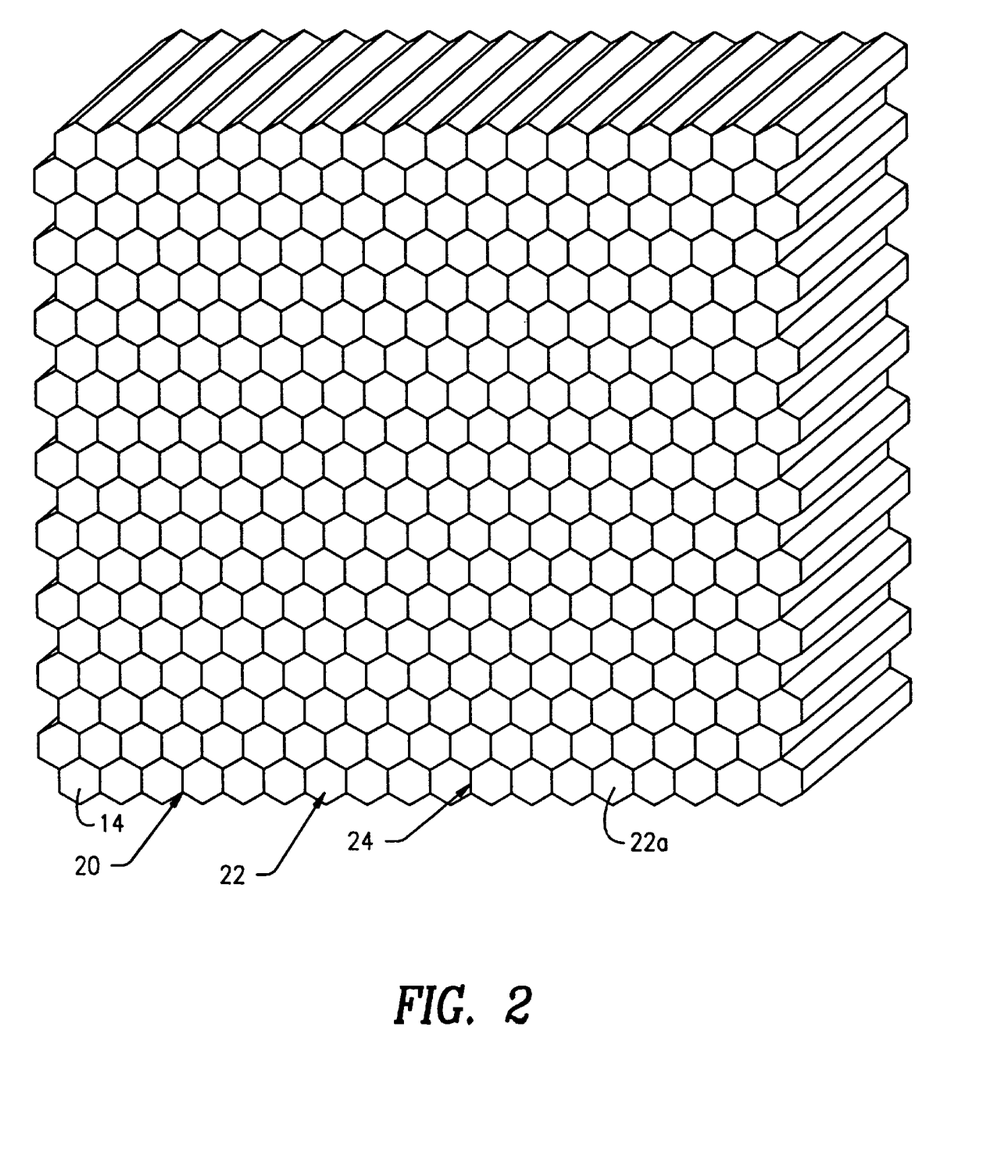
FIG. 2 is a perspective view of the honeycomb cell structure.
Figure 10:
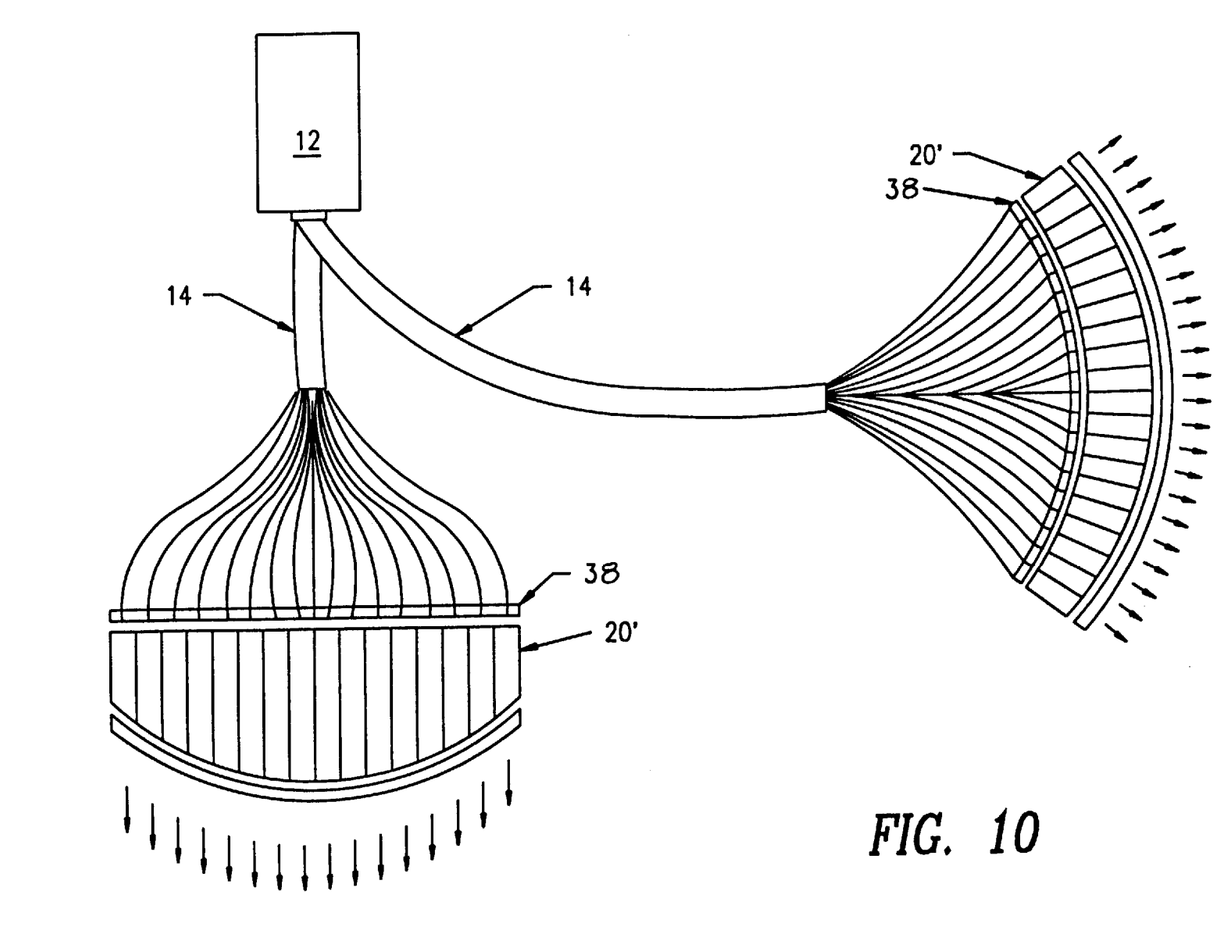
FIG. 10 shows a curved cellular reflector 20'.
Figure 11:
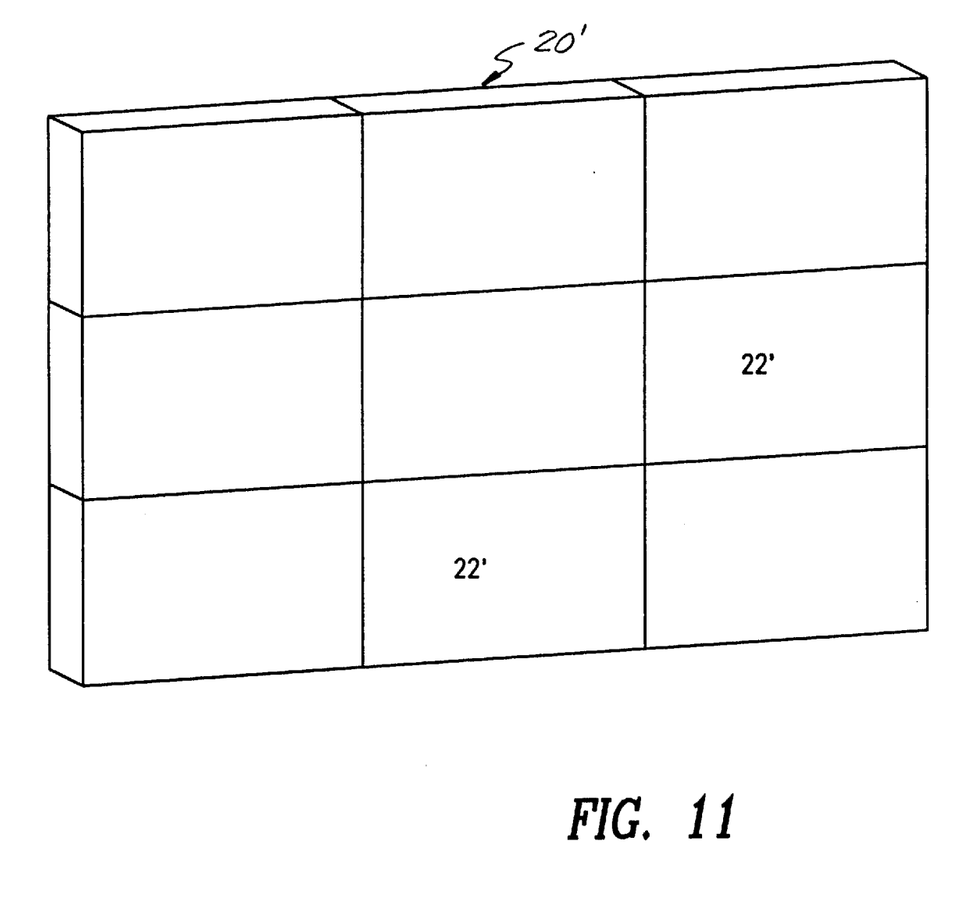
FIG. 11 shows square-shaped cells 22'.
Figure 12:
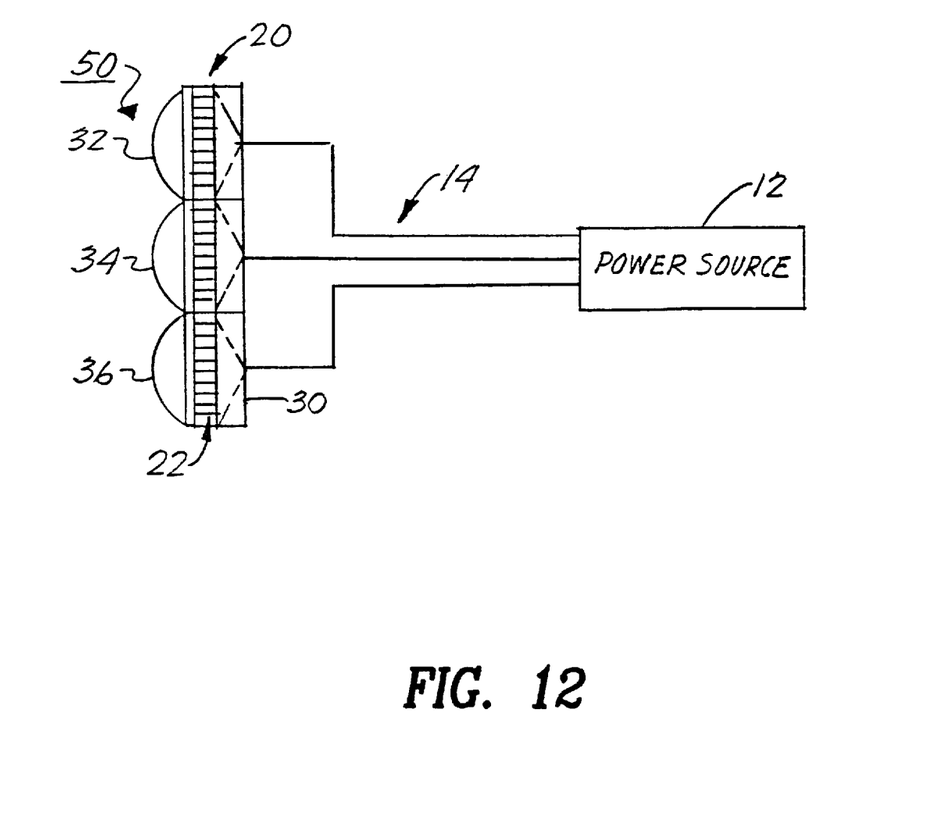
FIG. 12 shows cellular reflectors being used in a traffic light.

The fiber optic strands 14 are mounted in a honeycomb cell structure 20 having cells 22, which are hollow with internal passageways 22a. Openings 22b and 22c are at each end of each cell 22, with the openings 22b being on the viewing side of cell structure 20, and openings 22c being on the light-receiving side of cell structure 20. The cells 22 may be of any suitable shape, such as square 22', hexagonal, polygonal or the like. In the preferred embodiment, cells 22 are hexagonal in shape, are formed of aluminum, and have a highly reflective finish. The internal walls 24 of cells 22 are reflective for reflecting light. In addition, the size of the cells may be changed to provide more control of the light pattern. The cellular reflector 20' may also be curved in shape as shown in FIG. 10.

Fiber optic strands 14 are movably mounted within cells 22, so that the depth of insertion of strands 14 into cells 22 may be adjusted for controlling the amount and pattern of light reflected from the reflective walls 24 of cells 22. A platen 30 for depth adjustment is shown in FIG. 1, wherein the fiber optic strands 14a to 14t pass through platen 30 and are fixedly attached to platen 30. Thus, as platen 30 is moved to the left or right, the depth of insertion of fiber strands 14 in cells 22 is adjusted. By making such adjustments, the pattern of light coming out of the viewing side 22b of cell structure 20 may be varied.

Platen 30 is a metal or plastic plate having a plurality of holes 30a to 30t for receiving fiber optic strands 14a to 14t which are fixed to platen 30 so as to move with the platen. The pattern of holes in platen 30 matches the layout and pattern of cells 22, so that holes 30a to 30t and cells 22 are in alignment with each other. Thus, as platen 30 is moved to the left or right, it changes the depth of insertion of fiber strands 14 in respective cells 22.

In an alternative embodiment, honeycomb cell structure 20 may be formed of NOMEX, which is made of coated paper with a vacuum metallized reflective finish and is bendable or curvable, so that the pattern of light may be varied.

Figure 3:
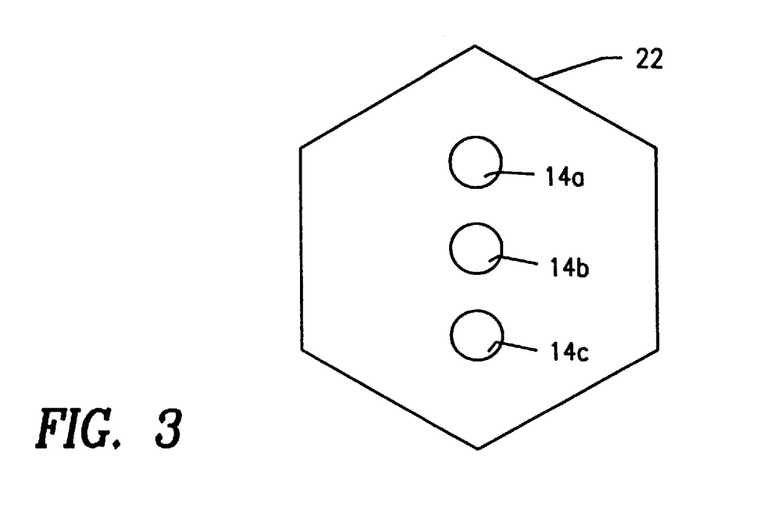
FIG. 3 shows another embodiment with three fiber optic strands in one cell.

Also, in another embodiment, as shown in FIG. 3, three or more fiber optic strands 14a, 14b, and 14c may be mounted within each cell 22. The light source 12 can provide the three primary colors to the three fiber optic strands in each cell. By changing the mix of the three primary colors, any desired color may be obtained.

Figure 4:
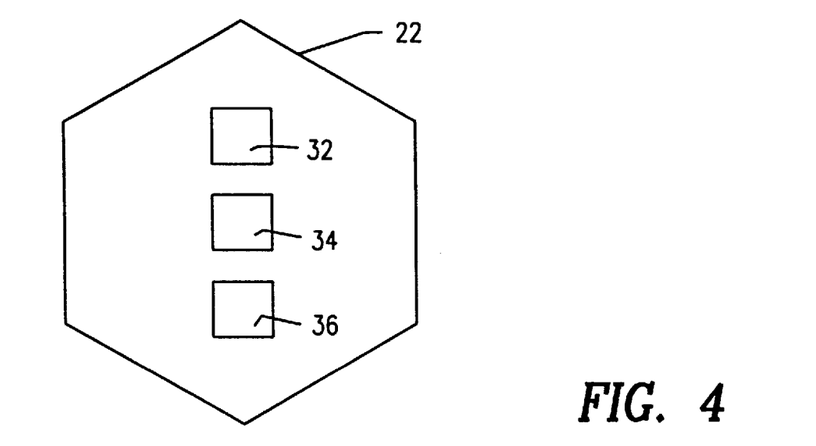
FIG. 4 shows another embodiment with three LEDs in one cell.
Figure 5:
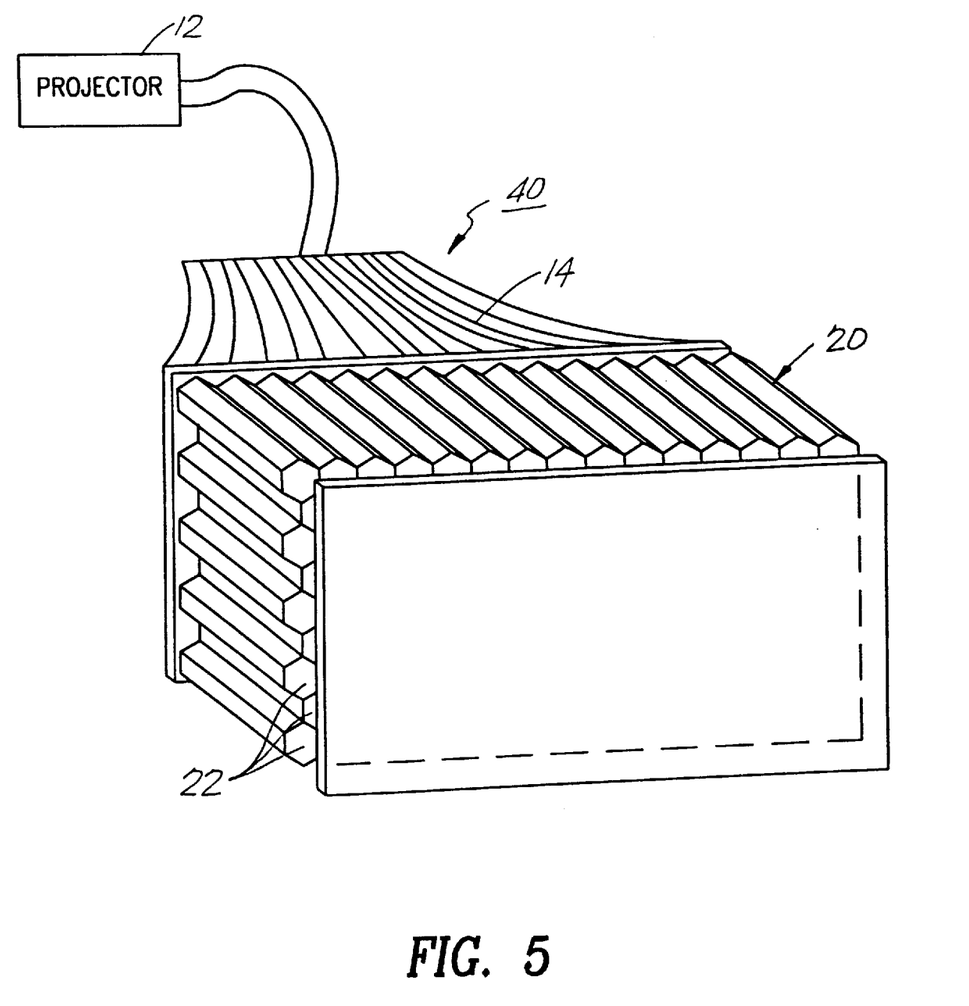
FIG. 5 is a perspective view of an automobile headlamp.
Figure 6:
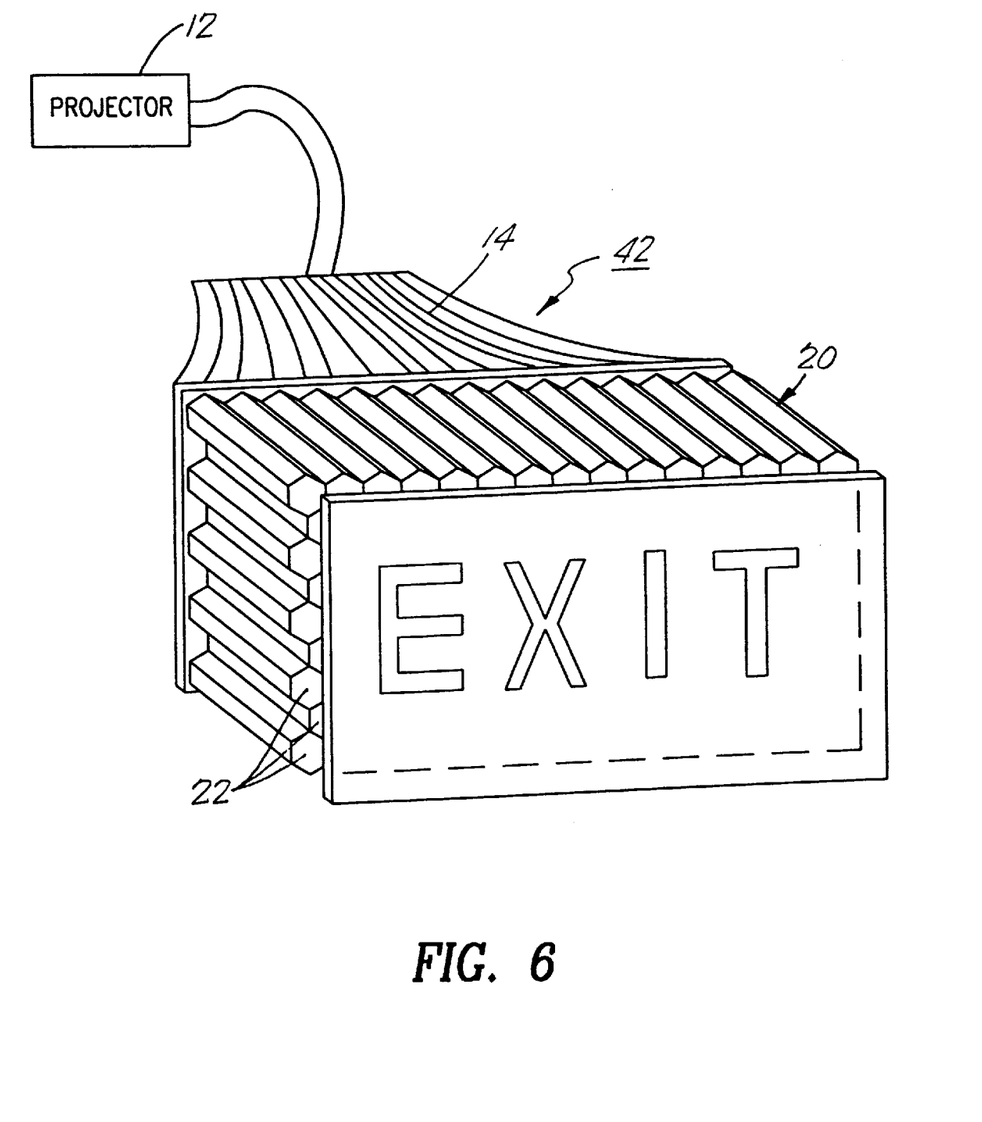
FIG. 6 is a perspective view of a roadway sign.
Figure 7:
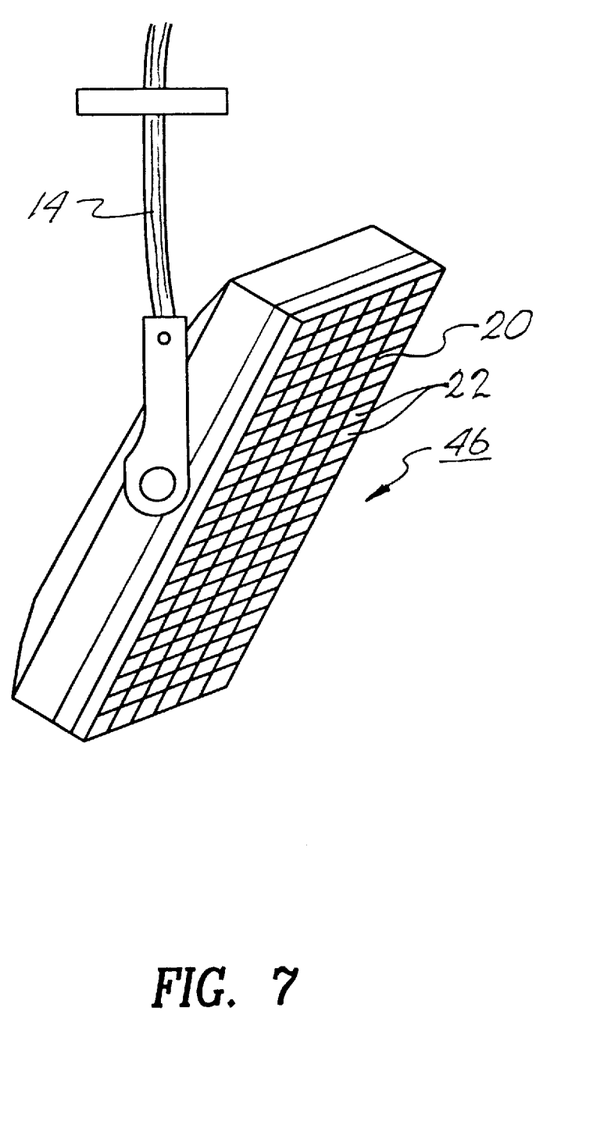
FIG. 7 is a lighting fixture hung from a ceiling or a roadway support.
Figure 8:
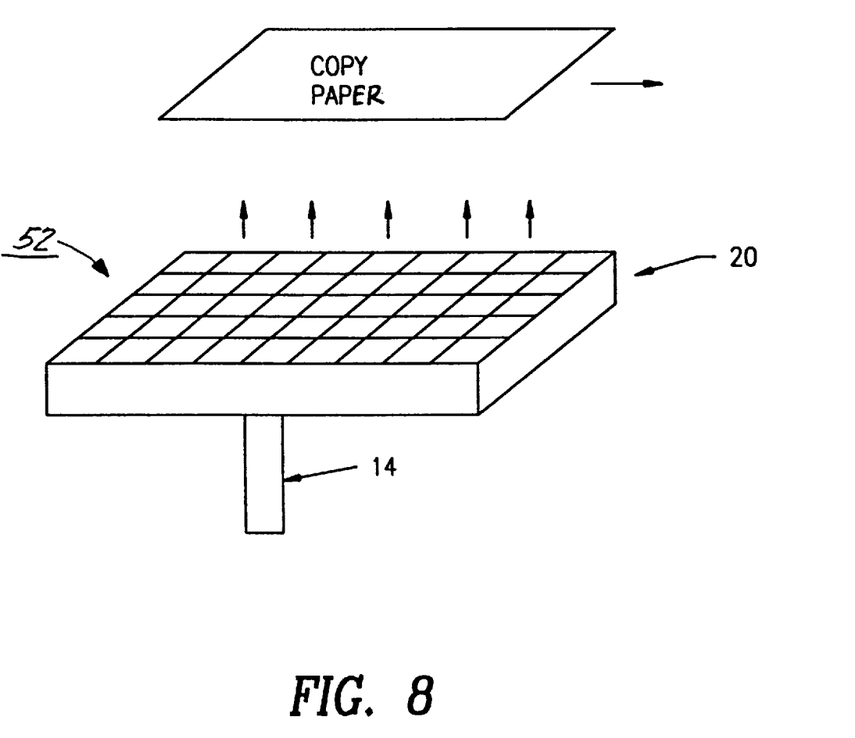
FIG. 8 is a lighting fixture for a copying machine or photolithography machine.
Figure 9:
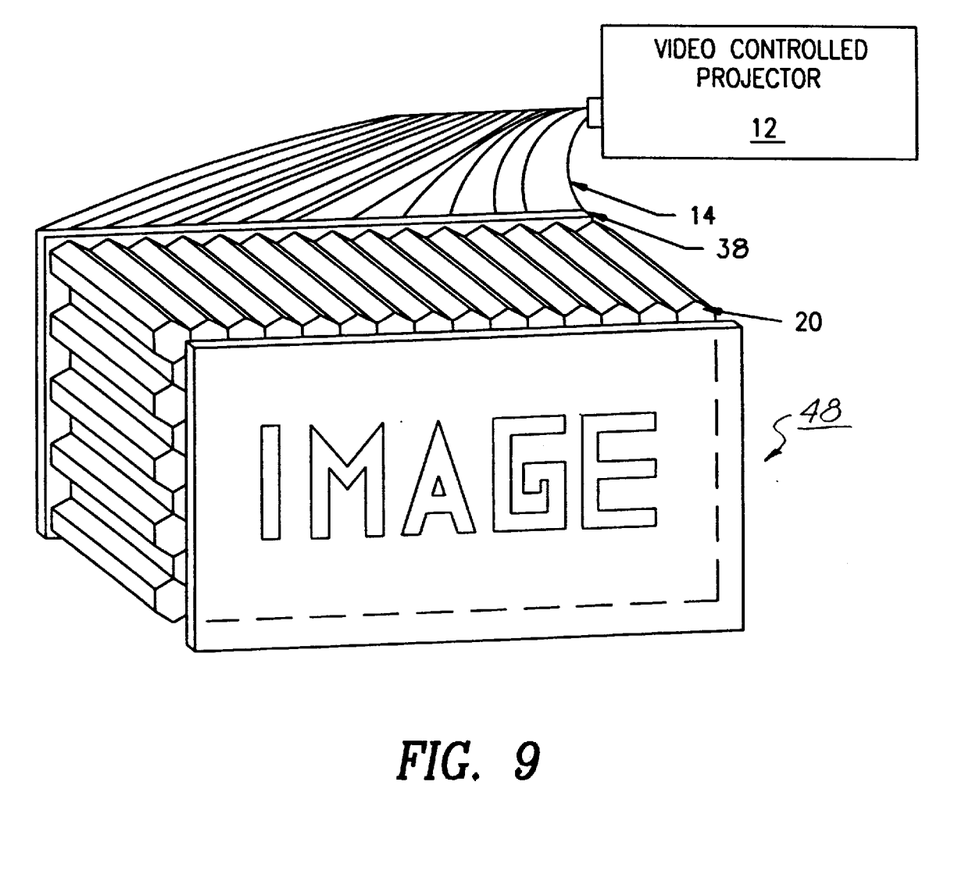
FIG. 9 is the cellular reflector of the present invention used to make a TV screen or VDT display.

In a third embodiment, as shown in FIG. 4, one or more LEDs 32, 34, and 36 may be mounted in each cell 22 for providing the desired light.

The present invention has numerous applications, such as in traffic signal lights 50, television screens 48, and VDT displays. The fiber optic cellular reflector of the present invention also has automotive applications and can be used as an automobile headlamp 40, an automobile reflector marker, a tail-light, or a brake light. Other lighting applications for the present invention are roadway lighting fixtures 44 and signs 42 and lighting fixtures for general illumination, photo-lithography, and photocopying machines 46.

A latitude of modification, change, and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein.

What is claimed is:

1. A fiber optic cellular reflector for producing a pattern of light, comprising:
   a) a honeycomb cell structure including a plurality of connected cells, wherein each of said cells has depth;
   b) at least one fiber optic strand mounted within each of said cells;
   c) means for supplying light to said at least one fiber optic strand in each of said cells;
   d) each of said cells having reflective walls for reflecting light from said fiber optic strand to produce the pattern of light;
   e) control means for uniformly adjusting the depth of said at least one fiber optic strand in each of said cells for controlling the pattern of light reflected from the reflective walls of said cells.

2. A fiber optic cellular reflector in accordance with claim 1, wherein each of said cells has a hexagonal shape.

3. A fiber optic cellular reflector in accordance with claim 1, wherein said honeycomb cell structure is formed of NOMEX.

4. A fiber optic cellular reflector in accordance with claim 1, wherein said honeycomb cell structure is in a curved shape.

5. A fiber optic cellular reflector in accordance with claim 1, wherein three (3) fiber optic strands are mounted within each of said cells and wherein said means for supplying light include means for supplying three different colors of light to said three fiber optic strands in each of said cells.

6. A fiber optic cellular reflector in accordance with claim 1, wherein said honeycomb cell structure is made of aluminum and has a highly reflective finish.

7. A fiber optic cellular reflector in accordance with claim 1, wherein each of said cells has a square shape.

8. A fiber optic cellular reflector in accordance with claim 1, wherein said fiber optic cellular reflector is used for a traffic signal light.

9. A fiber optic cellular reflector in accordance with claim 1, wherein said fiber optic cellular reflector is used for a television screen.

10. A fiber optic cellular reflector in accordance with claim 1, wherein said fiber optic cellular reflector is used for a VDT display.

11. A fiber optic cellular reflector in accordance with claim 1, wherein said fiber optic cellular reflector is used for an automobile light.

12. A fiber optic cellular reflector in accordance with claim 1, wherein said fiber optic cellular reflector is used for an automobile headlamp.

13. A fiber optic cellular reflector in accordance with claim 1, wherein said fiber optic cellular reflector is used for a roadway lighting fixture.

14. A fiber optic cellular reflector in accordance with claim 1, wherein said fiber optic cellular reflector is used for roadway signage.

15. A fiber optic cellular reflector in accordance with claim 1, wherein said fiber optic cellular reflector is used for a lighting fixture for general illumination.

16. A fiber optic cellular reflector in accordance with claim 1, wherein said fiber optic cellular reflector is used for a lighting fixture for photolithography.

17. A fiber optic cellular reflector in accordance with claim 1, wherein said fiber optic cellular reflector is used for a lighting fixture for photocopying machines.

18. A fiber optic cellular reflector in accordance with claim 1, wherein two (2) fiber optic strands are mounted within each of said cells and wherein said means for supplying light include means for supplying two different colors of light to said two fiber optic strands in each of said cells.

19. A fiber optic cellular reflector, comprising:
   a) a honeycomb cell structure including a plurality of connected cells, wherein each of said cells has depth;
   b) at least one fiber optic strand mounted and housed within each of said cells;
   c) means for supplying light to said at least one fiber optic strand in each of said cells; and
   d) each of said cells having reflective walls for reflecting light from said fiber optic strand therein to produce a pattern of light.

20. A fiber optic cellular reflector in accordance with claim 19, wherein each of said cells has a hexagonal shape.

21. A fiber optic cellular reflector in accordance with claim 20, wherein said honeycomb cell structure is formed of NOMEX.

22. A fiber optic cellular reflector in accordance with claim 19, wherein said honeycomb cell structure is in a curved shape.

23. A fiber optic cellular reflector in accordance with claim 19, wherein three (3) fiber optic strands are mounted within each of said cells and wherein said means for supplying light include means for supplying three different colors of light to said three fiber optic strands in each of said cells.

24. A fiber optic cellular reflector in accordance with claim 19, wherein said honeycomb cell structure is made of aluminum and has a highly reflective finish.

25. A fiber optic cellular reflector in accordance with claim 19, wherein each of said cells has a square shape.

26. A fiber optic cellular reflector in accordance with claim 19, wherein said fiber optic cellular reflector is used for a traffic signal light.

27. A fiber optic cellular reflector in accordance with claim 19, wherein said fiber optic cellular reflector is used for a television screen.

28. A fiber optic cellular reflector in accordance with claim 19, wherein said fiber optic cellular reflector is used for a VDT display.

29. A fiber optic cellular reflector in accordance with claim 19, wherein said fiber optic cellular reflector is used for an automobile light.

30. A fiber optic cellular reflector in accordance with claim 19, wherein said fiber optic cellular reflector is used for an automobile headlamp.

31. A fiber optic cellular reflector in accordance with claim 19, wherein said fiber optic cellular reflector is used for a roadway lighting fixture.

32. A fiber optic cellular reflector in accordance with claim 19, wherein said fiber optic cellular reflector is used for roadway signage.

33. A fiber optic cellular reflector in accordance with claim 19, wherein said fiber optic cellular reflector is used for a lighting fixture for general illumination.

34. A fiber optic cellular reflector in accordance with claim 19, wherein said fiber optic cellular reflector is used for a lighting fixture for photolithography.

35. A fiber optic cellular reflector in accordance with claim 19, wherein said fiber optic cellular reflector is used for a lighting fixture for photocopying machines.

36. A fiber optic cellular reflector for producing a pattern of light, comprising:
 a) a honeycomb cell structure including a plurality of connected cells wherein each of said cells has depth;
 b) at least one fiber optic strand mounted within each of said cells;
 c) means for supplying light to said at least one fiber optic strand in each of said cells; and
 d) each of said cells having reflective walls for reflecting light from said at least one fiber optic strand to produce the pattern of light;
 e) a depth adjuster in a form of a plate having holes therein receiving said fiber optic strands and adjusting the depth of said fiber optic strands in said cells for controlling the pattern of light reflected from the reflective walls of said cells.

37. A fiber optic cellular reflector in accordance with claim 36, wherein the holes in said depth adjuster are in alignment with the cells in said honeycomb cell structure.

\* \* \* \* \*